(12) United States Patent
Kim et al.

(10) Patent No.: US 7,072,189 B2
(45) Date of Patent: Jul. 4, 2006

(54) POWER SUPPLY

(75) Inventors: Sang Doo Kim, Changwon-si (KR); Kwon Ki Hong, Changwon-si (KR)

(73) Assignee: LG Electronics Inc., Seoul (KR)

( * ) Notice: Subject to any disclaimer, the term of this patent is extended or adjusted under 35 U.S.C. 154(b) by 87 days.

(21) Appl. No.: 10/720,747

(22) Filed: Nov. 25, 2003

(65) Prior Publication Data
US 2004/0156220 A1    Aug. 12, 2004

(30) Foreign Application Priority Data
Nov. 26, 2002   (KR) ...................... 10-2002-0074059

(51) Int. Cl.
*H02M 3/335* (2006.01)
(52) U.S. Cl. ..................... 363/16; 363/21.02
(58) Field of Classification Search ................. 363/19, 363/20, 21.4, 41, 16, 17, 95, 97; 323/282–284, 323/266, 267
See application file for complete search history.

(56) References Cited

U.S. PATENT DOCUMENTS 5,852,550 A * 12/1998 Majid et al. ............. 363/21.05
5,920,466 A *  7/1999 Hirahara .................. 363/21.02
6,154,374 A * 11/2000 Uejima et al. ............... 363/16

FOREIGN PATENT DOCUMENTS

KR         2000-3783          1/2000

* cited by examiner

*Primary Examiner*—Rajnikant B. Patel
(74) *Attorney, Agent, or Firm*—McKenna Long & Aldridge LLP

(57) ABSTRACT

A power supply is provided, by which power consumption of an electrical apparatus having a normal mode and a standby mode is reduced by including a dedicated power converter for the standby mode, to increase operational efficiency by means of feeding back an output voltage in standby mode to supply a constant voltage. The power supply includes a DC power unit for outputting a DC voltage; a microcomputer for outputting a mode control signal according to the operational mode of the electrical apparatus; a first power converter, controlled by the mode control signal, for converting the DC voltage output of the DC power unit into at least one operation voltage required for powering a plurality of loads; and a second power converter for supplying the microcomputer with a regulated feedback voltage in the standby mode of the electrical apparatus; and a switch for controlling an application of the DC voltage output of the DC power unit to the microcomputer through the second power converter, according to the mode of the electrical apparatus.

14 Claims, 2 Drawing Sheets

POWER SUPPLY

This application claims the benefit of Korean Application No. 10-2002-0074059 filed on Nov. 26, 2002, which is hereby incorporated by reference.

BACKGROUND OF THE INVENTION

1. Field of the Invention

The present invention relates to a power supply of an electrical apparatus, and more particularly, to a power supply employing a standby power converter for use in a standby mode of an electrical apparatus.

2. Discussion of the Related Art

Since a typical electrical apparatus operates on an AC power source but internally requires at least one DC power supply, the apparatus requires internal means for AC to DC conversion. Meanwhile, for saving energy, the same apparatus is provided with a standby mode, allowing continuous operation with minimum power consumption, in addition to a normal operational mode for its normal functions. During the standby mode, which is typically initiated by detecting a predetermined period of non-use, a microcomputer is supplied with minimum power to output a control signal for controlling the system while enabling a revival of the system's normal functions as desired. Accordingly, a voltage regulator is generally employed to output a regulated voltage during normal operation as well as during the standby mode, thus providing both normal operating power and standby mode power to the microcomputer.

FIG. 1 illustrates a power supply according to a related art, for use in an electrical apparatus as described above.

Referring to FIG. 1, a power supply of an electrical apparatus according to a related art is comprised of a DC power supply 10 for outputting a DC voltage converted from a commercial AC voltage source; a voltage regulator 20 for outputting a regulated voltage; a microcomputer 30, receiving the regulated voltage, for outputting a mode control signal according to the operational mode of the electrical apparatus, i.e., normal and standby; and a power converter 40, controlled by the mode control signal, for converting a received DC voltage into a plurality of operation voltages, for example, 5V and 12V, required for powering a plurality of loads 50 and 60.

In the operation of the above power supply, the DC power supply 10 outputs a DC voltage to the voltage regulator 20 and power converter 30, and the voltage regulator supplies a regulated voltage to the microcomputer 30, which uses the regulated voltage as its main power for outputting the mode control signal to the power converter 40. The main power requires regulation due to its simultaneous use for the overall operation of the power supply as well as other components of the electrical apparatus. In a normal operational mode, the mode control signal of the microcomputer 30 enables the power converter 40 to supply respective DC voltage outputs to the loads 50 and 60, but in standby mode, the mode control signal turns off the power converter, which cuts off the DC voltage outputs to one or more of the loads.

It should be noted that, as described above, the voltage regulator 20 is capable of supplying a regulated DC voltage having sufficient current to operate numerous components in the normal mode. Furthermore, since voltage regulation is inherently wasteful, the voltage regulator 20 operates at a low efficiency and is especially inefficient in the standby mode. Therefore, the power supply according to the related art, which uses the voltage regulator for the microcomputer's main power during standby mode, consumes excessive power even when operating in the standby mode.

SUMMARY OF THE INVENTION

Accordingly, the present invention is directed to a power supply that substantially obviates one or more of the problems due to limitations and disadvantages of the related art.

An object of the present invention, which has been devised to solve the foregoing problem, lies in providing a power supply, by which power consumption of an electrical apparatus is reduced by employing a dedicated power converter for standby mode, thereby increasing operational efficiency.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a power supply for use in an electrical apparatus having a plurality of operational modes including a normal mode and a standby mode. The power supply comprises a DC power unit for outputting a DC voltage; a microcomputer for outputting a mode control signal according to the operational mode of the electrical apparatus; a first power converter, controlled by the mode control signal, for converting the DC voltage output of the DC power unit into at least one operation voltage required for powering a plurality of loads; and a second power converter for supplying the microcomputer with a regulated feedback voltage in the standby mode of the electrical apparatus. The power supply further comprises a switch for controlling an application of the DC voltage output of the DC power unit to the microcomputer through the second power converter, according to the mode of the electrical apparatus.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations where possible.

The power supply according to the present invention is intended for use in an electrical apparatus having a plurality of operational modes including a normal mode and a standby mode.

Figure 1:
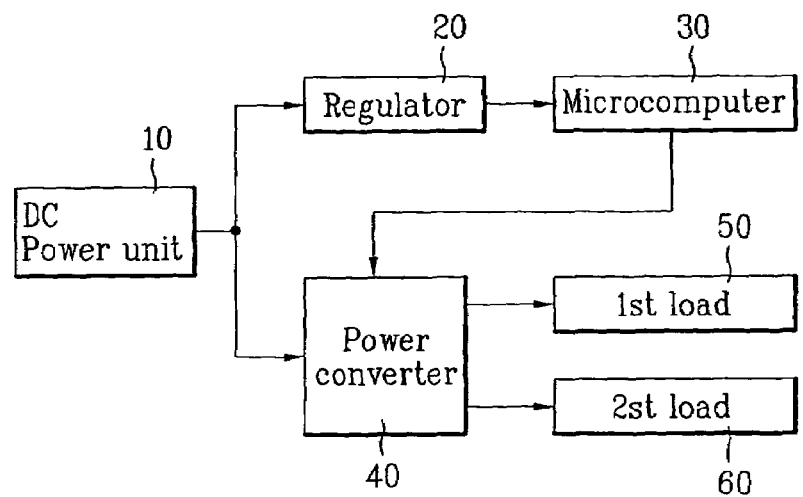
FIG. 1 is a block diagram of a power supply according to a related art, for use in an electrical apparatus.
Figure 2:
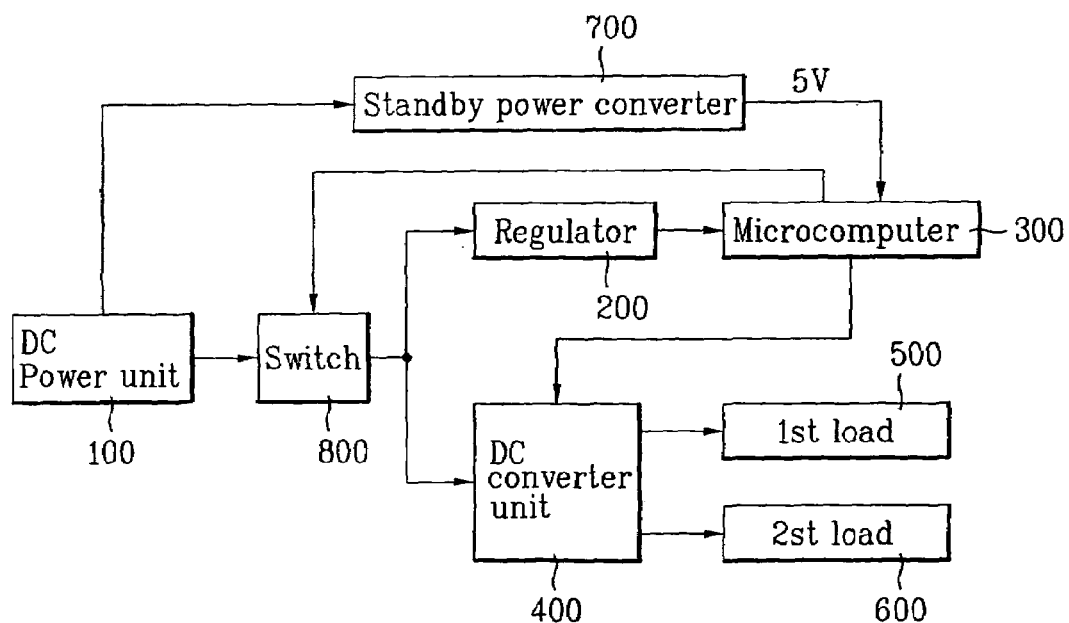
FIG. 2 is a block diagram of a power supply according to the present invention, is for use in an electrical apparatus.

Referring to FIG. 2, a power supply according to the present invention comprises a DC power supply 100 for outputting a DC voltage converted from a commercial AC voltage source; a voltage regulator 200 for outputting a regulated voltage and specifically for outputting a regulated voltage in the normal mode; a microcomputer 300, receiving the regulated voltage in the normal mode, for outputting a mode control signal according to the operational mode of the electrical apparatus, i.e., normal and standby; and a power converter 400, controlled by the mode control signal, for converting a received DC voltage into at least one operation voltage required for powering a plurality of loads 500 and 600. The example of FIG. 2 includes loads requiring operation voltages of 5V and 12V, respectively.

The power supply according to the present invention includes a standby power converter 700 for supplying the microcomputer 300 with a regulated feedback voltage in the standby mode of the electrical apparatus and a switch 800 for selecting DC power applied to the microcomputer 300 through the regulator 200 according to the mode control signal from the microcomputer, i.e., in the normal mode or standby mode of the electrical apparatus.

In the operation of the above-constructed power supply according to the present invention, the DC power unit 100 converts commercial AC power to DC power to be supplied to the voltage regulator 200 and the power converter 400, and the voltage regulator 200 outputs a regulated voltage to the microcomputer 300 based on the DC power supplied from the DC power unit. The microcomputer 300 uses the DC power supplied from the voltage regulator 200 as a main power for enabling the DC converter 400 and thereby control operation of the power supply of the electrical apparatus.

In standby mode, the microcomputer 300 outputs the mode control signal to the switch 800 to apply the DC power to the standby power converter 700, and the switch cuts off the DC power to the voltage regulator 200. Meanwhile, the microcomputer 300 disables the DC converter 400.

Figure 3:
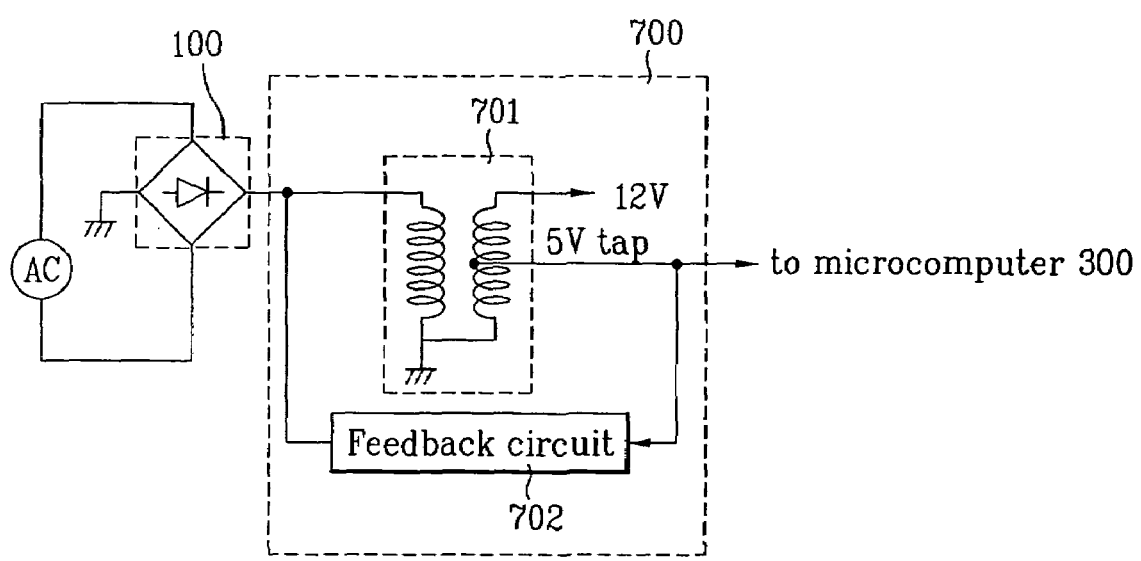
FIG. 3 is a circuit diagram of the standby power converter of FIG. 2.

Referring to FIG. 3, a preferred embodiment of the standby power converter 700 includes a transformer 701 having a plurality of taps, for example, a 5V tap and a 12V tap, to convert the DC power from the DC power unit 100 to the constant voltage. The 5V output is fed back through a feedback circuit 702. That is, to minimize power consumption in the standby mode, the standby power converter 700 reduces 12V to 5V.

Accordingly, a power supply according to the present invention employs the standby power converter 700 having the transformer 701 of a small capacity. Hence, the present invention reduces transformation loss, to decrease standby power consumption. The power supply according to the present invention feeds back a low voltage in standby mode to provide a constant voltage.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A power supply for use in an electrical apparatus having a plurality of operational modes including a normal mode and a standby mode, the power supply composing:
   a DC power unit for outputting a DC voltage;
   a microcomputer for outputting a mode control signal according to the operational mode of the electrical apparatus;
   a first power converter, controlled by the mode control signal, for converting the DC voltage output of said DC power unit into at least one operation voltage required for powering a plurality of loads; and
   a second power converter for supplying said microcomputer with a regulated feedback voltage in the standby mode of the electrical apparatus, wherein said second power converter has at least two power taps.

2. The power supply as claimed in claim 1, further comprising a switch for controlling application of the DC voltage output of said DC power unit to said microcomputer through said second power converter according to the mode of the electrical apparatus.

3. The power supply as claimed in claim 2, wherein the DC voltage output of said DC power unit is applied to said microcomputer through said second power converter in the standby mode of the electrical apparatus.

4. The power supply as claimed in claim 1, further comprising a voltage regulator for outputting a regulated voltage to said microcomputer in the normal mode of the electrical apparatus.

5. The power supply as claimed in claim 1, wherein said second power converter comprises a transformer.

6. The power supply as claimed in claim 5, wherein the transformer has a tapped output.

7. The power supply as claimed in claim 5, wherein the at least two power taps of said second power converter are 5V and 12V taps, respectively.

8. The power supply as claimed in claim 6, further comprising a feedback circuit connected between the tapped output and an input of the transformer.

9. The power supply as claimed in claim 8, wherein the tapped output is a 5V tap.

10. A power supply for use in an electrical apparatus having a plurality of operational modes including a normal mode and a standby mode, the power supply comprising:
    a DC power unit for outputting a DC voltage;
    a microcomputer for outputting a mode control signal according to the operational mode of the electrical apparatus;
    a first power converter, controlled by the mode control signal, for converting the DC voltage output of said DC power unit into at least one operation voltage required for powering a plurality of loads; and
    a transformer as a second power converter for supplying said microcomputer with a regulated feedback voltage in the standby mode of the electrical apparatus,
    wherein said transformer has at least two power taps, the at least two power taps including a tapped output that is fed back to an input of said transformer.

11. The power supply as claimed in claim 10, wherein said microcomputer receives the tapped output of said transformer during the standby mode.

12. The power supply as claimed in claim 10, wherein the at least two power taps of said transformer generate at least two different voltage level outputs, the at least two different voltage level outputs including a higher voltage and a lower voltage.

13. The power supply as claimed in claim 11, wherein the tapped output fed back to the input of said transformer is the lower voltage output of said transformer.

14. The power supply as claimed in claim 11, wherein, during the standby mode, said microcomputer operates based on the lower voltage output of said transformer.

* * * * *